June 1, 1965 D. H. LESLIE 3,187,236

MEANS FOR INSULATING SUPERCONDUCTING DEVICES

Filed March 19, 1962

INVENTOR.
DON H. LESLIE

BY

ATTORNEY

United States Patent Office 3,187,236
Patented June 1, 1965

3,187,236
MEANS FOR INSULATING SUPERCONDUCTING DEVICES

Don H. Leslie, Northridge, Calif., assignor to North American Aviation, Inc.

Filed Mar. 19, 1962, Ser. No. 180,739
5 Claims. (Cl. 317—158)

Figure 2:
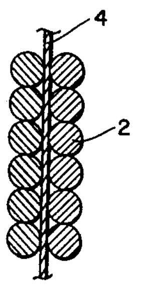

The present invention relates to improved superconducting coils and magnets, and more particularly to improved means for insulating superconducting devices.

Superconducting devices have opened a whole exciting new field of vast practical and theoretical importance. Superconductivity is the property of certain materials, at temperatures approaching absolute zero, to carry current without power dissipation. Such materials, at temperatures below a certain critical temperature, $T_c$, have no electrical resistivity, and therefore have no $I^2R$ losses. This phenomenon has been experimentally verified. Coils of such materials in liquid helium baths, with currents induced by withdrawing a permanent magnet from a position within the coil, have carried the resulting currents for periods of two years without any voltage drop. The factors controlling superconductivity of such materials are the interrelation of magnetic field strength H, critical current density $J_c$, and critical temperature $T_c$. The magnetic field strength, applied externally or generated by a current in the superconductor, limits superconductivity to below certain temperatures and current densities. Similarly, at a given field strength, an increase in temperature and/or current density can destroy superconductivity.

The large current-carrying capacity of superconductors provides the basis for very compact, super-powerful magnets which can be used in numerous applications where strong magnetic fields are required, for example, in lasers, masers, accelerators, and bubble chambers. It is calculated that the capital cost of a particular installation using such a magnet in place of a conventional electromagnet would be a factor of 100 less, and that the operating cost would be a factor of 80,000 less, due to the smaller physical size and the absence of power consumption or heat dissipation requirements for the magnet itself.

The phenomenon of superconductivity and the potential promise of superconducting materials is well known in the art (see, for example, Time magazine, March 3, 1961, p. 52, and Low Temperature Physics, Simon et al., Academic Press, pp. 95–132). A number of superconducting materials are known to the art, for example $Nb_3Sn$, and Nb–Zr alloy. See also U.S. Patent 2,866,842.

Superconducting devices display the tendency, for reasons not thoroughly understood, but believed to include application of excessive current or by local heating, to be on occasion driven "normal," that is, no longer superconducting, after which a superconducting condition can be re-established. This causes large induced voltage drops to appear across the superconducting magnet. The induced voltage is given by the expression $-L dI/dt$ where L is the inductance of the magnet, I is the current, and $t$ is the time. Since the currents are very large and the field collapses very rapidly, the induced voltages are extremely large, say in the order of 100,000 or more volts. Such voltage bursts are damaging to dielectric materials used as the insulation in superconducting coils or magnets.

Superconducting devices have utilized dielectric materials as insulators either around superconducting wire or as thin sheets between layers of windings. The dielectric materials are subjected to the destructive dielectric stresses arising from the large voltages when the superconductor is driven normal, and tend to shortly fail, causing short circuiting in the superconducting devices.

An object of the present invention, therefore, is to provide an improved superconducting device.

Another object is to provide a method of preventing short circuiting of superconducting devices by voltage surges caused by the devices going normal occasionally and destroying dielectric insulators.

Still another object is to provide a superconducting device having an improved insulator between adjacent layers of a coil which is not subject to breakdown by large voltage surges.

A further object of the present invention is to provide a configuration for a superconducting device having a novel insulating material not subject to breakdown.

Further objects and advantages of my invention will become apparent from the following detailed description and claims, taken together with the appended drawings.

Figure 1:
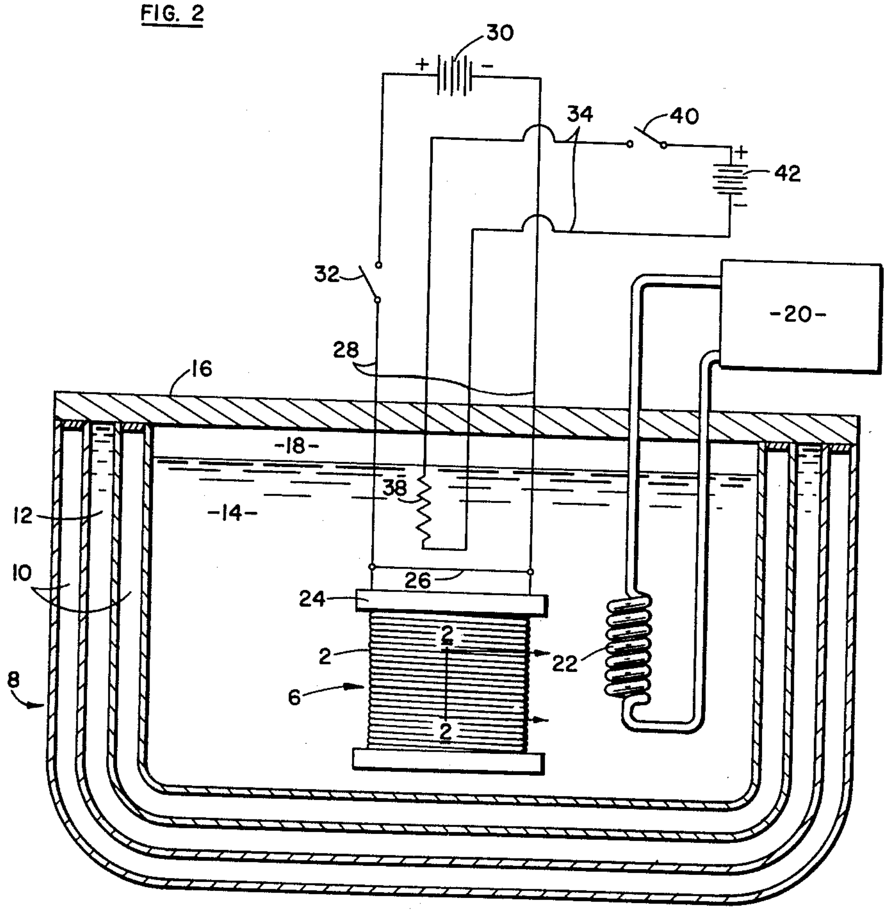

In the drawings, FIG. 1 is a schematic representation, partly in section, of a superconducting magnet apparatus, and FIG. 2 is a section through the magnet coil taken along the line 2—2 showing the present insulating means and arrangement.

As seen in FIG. 2, in the present invention bare superconducting wire 2 is wound in a plurality of layers around a core or magnet form. Sheets 4 of a normal metal, alloy, or semiconductor are disposed between adjacent layers. The term "normal" is used herein in its conventional sense to define a non-superconducting material which ordinarily conducts electricity and has measurable electrical resistivity at cryogenic temperatures. The line contact between adjoining turns of superconducting wire in the same layer is unable to support much current flow transverse to the turns. Further, the oxide layer and the thin film of drawing lubricant frequently on the superconducting wire may serve to insulate turn from adjoining turn within each layer of turns. In some instances, however, a small number of superconducting shorted loops may exist, which leads to some hysteresis in the magnetic field versus current relation. For most applications, this is of little consequence.

The basis of the invention lies in the surprising discovery that non-dielectric materials, which ordinarily serve as electrical conductors, can effectively function as insulators in the superconducting devices. Such materials do not undergo the breakdown caused by voltage surges upon the superconducting device occasionally going normal and, therefore, the life and efficiency of the superconducting device is considerably lengthened.

The seemingly anomalous behavior of such excellent conductors as copper, silver, gold, and nickel in functioning as insulators in a superconducting device is explained on the basis that, in comparison with superconducting wire which has no electrical resistivity, the normal metal represents an infinite resistance, and theretofore no current passes therethrough. Extremely sensitive voltage measurements have shown no voltage drop occurred in superconducting coils of the present configuration. Any normal metal or alloy which can be fabricated into suitably thin sheets may function as the insulating material between the adjacent layers of superconducting wire. Similarly any semiconducting material in thin sheets may be used.

Reference is made to FIG. 1 for an illustration of a specific magnet device using the present winding and insulation arrangement. Any number of magnet and coil arrangements may of course be devised by those skilled in the art, and the particular design will be considerably influenced by the proposed use of the superconducting device. The magnet assembly 6 is positioned in a double walled Dewar flask 8 having two vacuum regions 10 with an intermediate region 12 containing liquid nitrogen. Other thermally insulated containers may be used. The vessel is filled with liquid helium 14 and separated from the environment by suitable enclosure means 16. The space 18 between the liquid helium and the cover is filled with helium gas. The temperature of the bath is maintained by a refrigerator system 20 having a cooling coil 22 which accurately maintains temperatures between 1–10° K. The magnet 6 consists of superconducting wire 2, such as niobium-25 atom per cent zirconium alloy, wound about a spool 24 with sheets of normal metal positioned between adjacent layers of turns. The spool may be of a normal metal or an organic resin such as a phenolic resin. A superconducting bridge or switch 26 is positioned across the magnet coil. Ordinary conducting wires 28 connect the magnet to an external battery 30 and switch 32, leaving the superconducting switch in parallel across the magnet in the circuit. A second circuit using ordinary wire 34 also enters the flask. It has a resistance heater element 38 adjacent the superconducting switch, and an external on-off switch 40 and battery 42.

The operation of the system is as follows. Switches 32 and 40 are closed, thereby producing current flow in both circuits. The heater element 38 next to superconducting switch 26, provides just sufficient heat to raise its temperature above $T_c$, thereby directing all current flow in the circuit through the magnet. The switches are then opened, and the field around the magnet tries to decay. Since the heater element is off, the switch 26 now becomes superconducting and a new electrical circuit consisting entirely of the superconducting wire is established. The use of the superconducting switch is not necessary; current can continually be supplied from an external circuit, with power consumption occurring only in the external circuit.

As there are no power losses in this magnet circuit (the voltage drop in the initial circuit with the switch closed, required to satisfy Kirchhoff's law, is in the external circuit) a permanent magnet effect is obtained and no further power is required to sustain the magnetic field. The field strength and direction of the resulting magnetic field outside the container is conventionally determined. Therefore, after the magnet is once energized, both external battery circuits can be removed. The only continuing power requirement is that of the refrigerator operator system necessary to maintain the temperature of the helium bath. However, this is an extremely tiny fraction of the power requirements of a conventional electromagnet of equivalent field strength where large wattages are dissipated in the magnet, and where additional power is consumed in cooling devices.

A superconducting solenoid is designed for a selected field strength, according to the formula $$H_0=1.26\lambda jt$$

where $H_0$ is the axial field, in gauss, at the center of an infinitely long air-core solenoid, $\lambda$ is the filling factor, $j$ is the current density in the conducting part of the windings in amp/cm.$^2$, and $t$ is the winding thickness in cm. This equation is a good approximation for most solenoid designs providing that the ratio of length to average diameter is greater than $\sim 3$.

As an example of the present invention, a 59 kilogauss superconducting solenoid was fabricated and satisfactorily tested according to the above formula. The solenoid was wound with two lengths of 0.010 in. diameter Nb-25 atom percent Zr wire for a total length of about 4850 ft. (1.39 lbs.). The finished solenoid had an inner diameter of 0.5 cm, an outer diameter of 5.6 cm, a winding thickness, $t$, of 2.55 cm, a length of 5 cm, a filling factor, $\lambda$, of 0.61, and contained a total of about 15,200 turns. The bare uninsulated wire was perfect layer wound, and sheets of 0.002 in. thick copper foil were inserted between the layers of turns during the winding. The two wire lengths in the magnet wound one upon the other, were wound in series, cooled to 4.2° K. (liquid helium temperature), and energized with a low impedence current supply.

The field was measured with an accuracy of about ±1% with a small search coil connected to a fluxmeter. A calibration of the magnetometer was obtained in an applied magnetic field of 20 kilogauss produced by a proton-resonance calibrated iron-core electromagnet. The peak field of 59 kilogauss in the superconducting magnet was generated by a current of 19 amp, or a current density in the wire of 37,500 amp/cm.$^2$. No attempt was made to reach a higher peak field by separate or parallel energization of the two wire lengths of the magnet, or by cooling the magnet to a temperature below 4.2° K. The performance of the 59 kilogauss superconducting solenoid was in reasonable agreement with the above equation.

The onset of resistance in the coil at the peak field was sudden and resulted in immediate quenching of the current, an audible report, and a slight boil-off of liquid helium. After several minutes at zero current the magnet was re-energized and behaved exactly as in the period before going normal. Other super-conducting solenoids which have been tested with lacquer or nylon insulated wire have not always displayed such recovery after breakdown, evidently due to insulation failure under the high voltages generated between the layers during breakdown. In several cases, unwinding, reinsulating, and rewinding of the wire were necessary to return such magnets to operable conditions.

The above example is illustrative rather than restrictive of my invention which is understood to be limited only as indicated in the appended claims.

I claim:

1. In a superconducting electromagnet comprising a coil wound on a magnet form, the coil having a plurality of layers of bare superconducting wire with each layer having a plurality of adjoining turns in direct contact, wherein when said magnet in an energized superconductive state goes to a normally conductive state, substantial voltage stresses occur ordinarily damaging to dielectric material present for providing insulation between adjacent coil layers of the magnet, whereby the life of the magnet is shortened, the improvement for increasing magnet life comprising a thin sheet of normally conductive material positioned between said adajacent coil layers.

2. The apparatus of claim 1 wherein said sheet of normally conductive material is selected from the class consisting of normal metals, metallic alloys and semiconductors.

3. The apparatus of claim 2 wherein said sheet is of a normal metal.

4. The apparatus of claim 2 wherein said sheet is of a normal metal alloy.

5. The apparatus of claim 2 wherein said sheet is of a semiconductor material.

References Cited by the Examiner

UNITED STATES PATENTS

| | | | |
|---|---|---|---|
| 2,444,737 | 7/48 | Heath | 336—206 |
| 3,109,963 | 11/63 | Geballe | 317—158 |

OTHER REFERENCES

Din et al.: Low-Temperature Techniques, published by Georges Newnes Ltd., London, 1960 pages 133–136.

Meyers: "Thin Film Insulation in Superconducting Systems," IBM Technical Disclosure Bulletin, vol. 4, No. 7, December 1961, page 94.

Stierhoff: "Laminar Cryotronic Structures," IBM Technical Disclosure Bulletin, vol. 3, No. 18, April 1961, page 49.

Tanenbaum et al.: "Superconductors," Interscience Publishers, Feb. 18, 1962, paper by Betterton et al., pages 61 and 65.

JOHN F. BURNS, *Primary Examiner.*

JOHN P. WILDMAN, *Examiner.*